(12) United States Patent
Knutson

(10) Patent No.: US 6,205,901 B1
(45) Date of Patent: Mar. 27, 2001

(54) QUICK TOOL CHANGE FOR PUNCH

(75) Inventor: Robert C. Knutson, Minnetonka, MN (US)

(73) Assignee: Tamarack Habilitation Technologies, Inc., St. Paul, MN (US)

( * ) Notice: Subject to any disclaimer, the term of this patent is extended or adjusted under 35 U.S.C. 154(b) by 0 days.

(21) Appl. No.: 09/393,555

(22) Filed: Sep. 10, 1999

Related U.S. Application Data

(60) Provisional application No. 60/100,475, filed on Sep. 16, 1998.

(51) Int. Cl.$^7$ .............................. B26D 1/00; B26D 7/06
(52) U.S. Cl. ...................... 83/698.91; 83/140; 83/628; 83/633
(58) Field of Search ............................ 83/628, 633, 634, 83/685, 548, 698.91, 140

(56) References Cited

U.S. PATENT DOCUMENTS

| | | |
|---|---|---|
| 165,466 | 7/1875 | Baer . |
| 563,098 | 6/1896 | Thompson . |
| 847,167 | 3/1907 | Derry . |
| 939,958 | 11/1909 | Koelsch . |
| 1,360,905 | 11/1920 | Dubois . |
| 1,999,057 | 4/1935 | Peterson et al. ............... 72/452.8 |
| 3,416,397 | * 12/1968 | Preston ............... 83/633 |
| 3,715,947 | 2/1973 | Weisbeck et al. ............... 83/140 |
| 3,741,056 | 6/1973 | Saladin ............... 83/140 |
| 3,779,113 | 12/1973 | Jestin ............... 83/140 |
| 5,832,798 | * 11/1998 | Schneider et al. ............... 83/698.91 |

* cited by examiner

Primary Examiner—W. Donald Bray
(74) Attorney, Agent, or Firm—Westman, Champlin & Kelly, P.A.

(57) ABSTRACT

A punch assembly includes a frame that has a pair of arms forming a deep throat for receiving material to be punched, and a single acting punch and die set held by the outer ends of the arms. The punch is actuated with a lever mounting a swing frame that is supported so that when the punch is to be changed, the swing frame can be moved out the way and the punch removed. The die can also be removed when the swing frame is moved away from its working position. The punch can be actuated through the lever either with a manual handle, or with a power actuator.

17 Claims, 3 Drawing Sheets

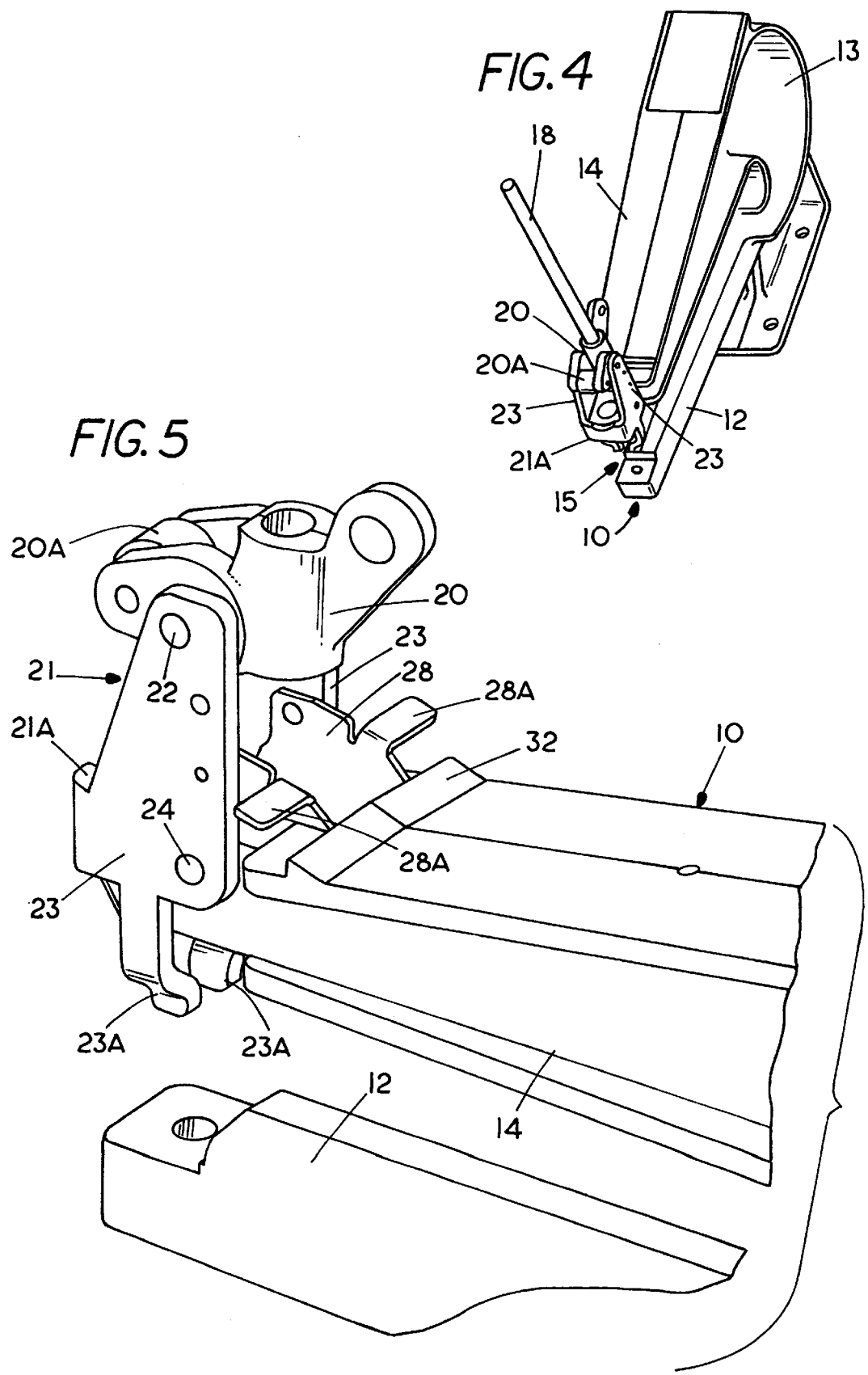

QUICK TOOL CHANGE FOR PUNCH

CROSS REFERENCE TO RELATED APPLICATION

Reference is made to copending application Ser. No. 60/100,475, filed Sep. 16, 1998 entitled QUICK TOOL CHANGE FOR PUNCH.

BACKGROUND OF THE INVENTION

The present invention relates to a punch that is used for punching suitable material that has a main support that houses a sliding punch, and is used in connection with a bracket mounting a cam for moving the punch, which will swing out of the way so that the punch can be removed and replaced with another punch.

Various punches for forming holes in materials have been used, and usually the punch has to be changed or replaced with tools that will remove threaded punches, and dies or other tools for removal and replacement.

SUMMARY OF THE INVENTION

The present invention relates to a punch press that has a deep throat for receiving punchable materials, such as relatively thin plastics. The press has a frame comprising two arms, an upper one of which as shown mounts a punch and the other of which has a removable die mounted therein. The punch and die act along an operating axis that is perpendicular to the plane of the throat. The punch slides in a suitable bore in the upper arm, and is spring loaded away from the arm at the upper end. The punch is actuated through the use of a lever or bell crank mounting a cam that is mounted onto a swing bracket and operated with an operator, such as a manual lever or a fluid pressure cylinder. The swing bracket has plates on opposite sides of the upper press arm, and has stripper prongs extending down alongside the punch. The swing bracket is pivotally mounted on the upper arm as shown. The swing bracket mounts the cam on a pivot at an upper end of the swing bracket, that is above the pivot of the swing bracket to the upper arm. The swing bracket is held in its operable position with a backstop or latch that pivots down against a lug on the casting on the upper arm and when in working position prevent pivoting of the swing bracket under punching loads.

The swing bracket can be pivoted out of the way of the punch when the punch is to be removed by moving the back stop away from its supporting shoulder or lug, and pivoting the bracket rearwardly until the roller cam clears the path of the punch so the punch can be pulled out of its mounting to the upper arm. The die also is merely slid out of its mounting bore so it can be replaced at the same time the punch is replaced.

When a new punch has been inserted, the swing bracket is moved to its working position, and the back stop or latch drops down into its latched position under gravity. The cam can also be operated with a pneumatic cylinder as an option, or with a manual lever that will cause the roller cam to force the punch through the material and through the opening of the die.

BRIEF DESCRIPTION OF THE DRAWINGS

FIG. 4 is a perspective top front view of the punch press of FIG. 1 with a manual lever actuator in place;

FIG. 5 is a fragmentary enlarged rear perspective view of the punch press with a swing bracket used in connection with a punch and die for the punch press of FIG. 1;

DETAILED DESCRIPTION OF THE PREFERRED EMBODIMENTS

Figure 6:
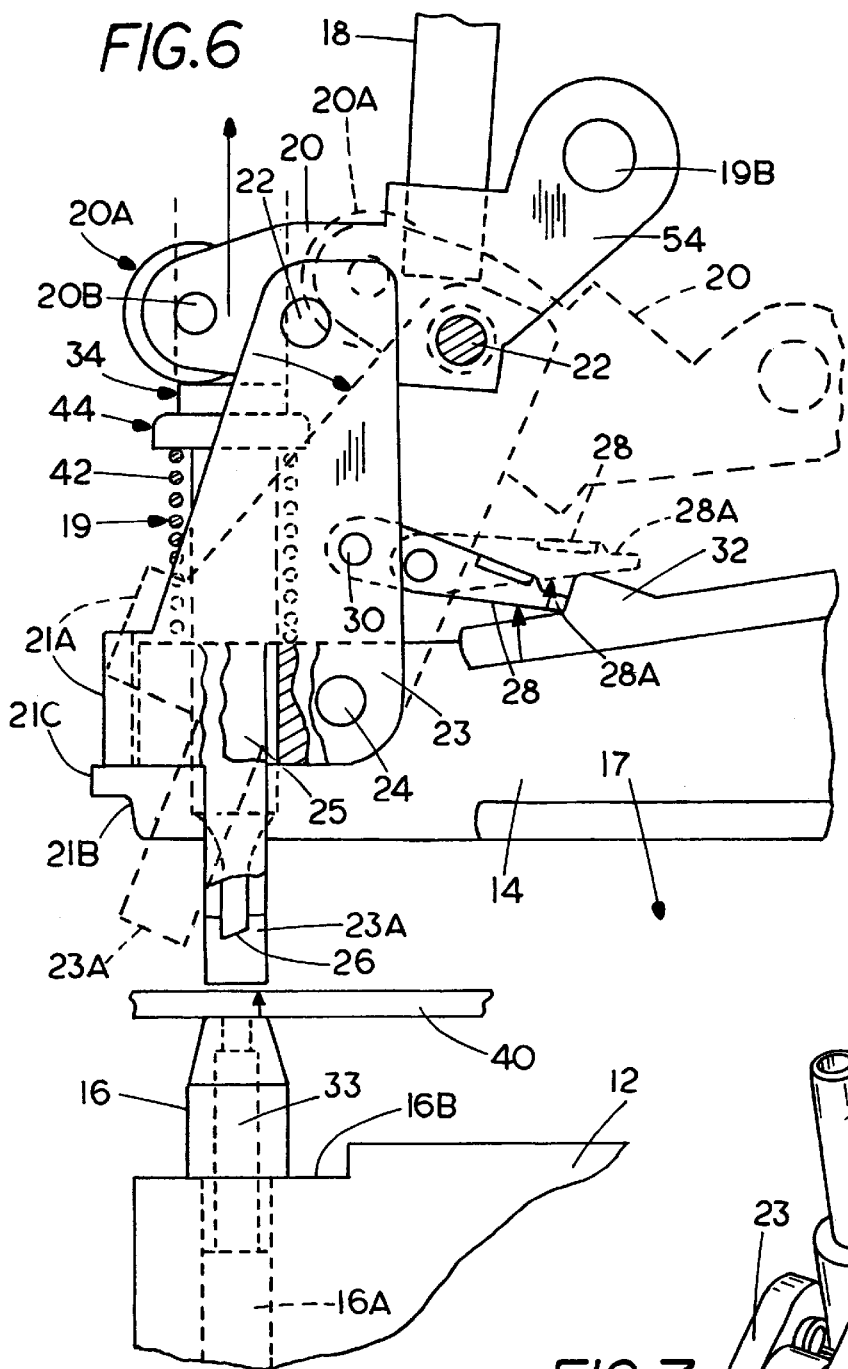
FIG. 6 is a side elevational view of the mounting end of the punch press arms showing a swing bracket in operating position relative to a punch and die, and showing an alternate position of the swing bracket for removal of a punch and die set in dotted lines.

The punch press assembly indicated generally at 8 includes a punch press frame 10, that has a lower arm 12 and an upper arm 14 held together at a base end 13. The base end 13 is spaced from the working end 15 a sufficient distance so that there is a very deep throat opening 17 formed between the arms 12 and 14. The throat opening length is between 6 to 10 times the clearance between the arms adjacent the die and punch indicated by double arrow 17B. The working or outer end 15A of the lower arm 12 is machined and has a bore 16A which receives a die 16 (FIG. 6). The die 16 is supported on a machined shoulder surface 16B. The die 16, of course, can have any desired cross sectional configuration. The die 16 operates in connection with a punch assembly 19 (FIG. 6) that has a punch 27 with an end 26 of a desired configuration, that is shown in FIG. 6. One of a pair of piece part strippers 23A that straddle the punch is broken away to show the punch. The punch 27 has a shank 25 which slides in a suitable bore 25 in the upper arm 14 of frame 10. The bore 25 can be in a separate sleeve held in the arm, if desired.

The punch has a punch head 34, and an annular spring retainer 44 against which a spring 42 operates to retract the punch end 26 to its position shown in FIG. 6 whenever the punch 27 is not being used for punching a sheet of material 40, that is shown resting on the top of the die 16. The punch 27 slides in the bore 25 when downward force is applied to the punch head 34.

Figure 1:
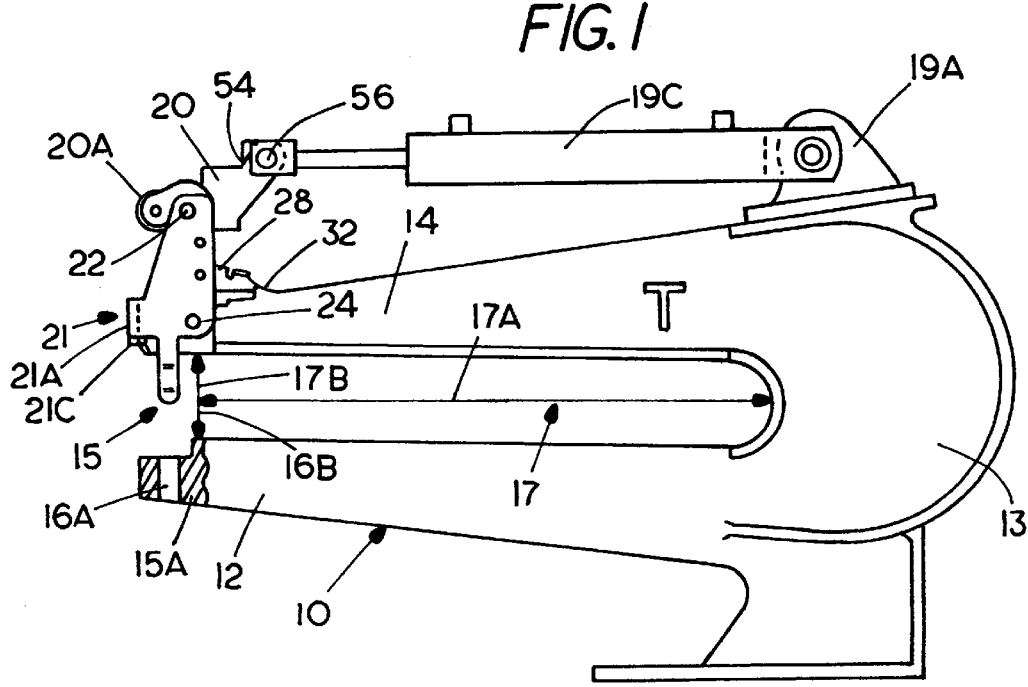
FIG. 1 is a side elevational view of a punch press made according to the present invention.
Figure 7:
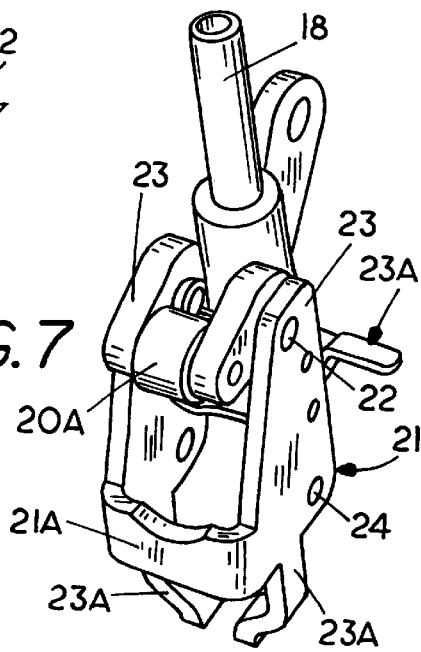
FIG. 7 is a top front perspective view of a swing bracket shown in FIG. 6.

The punch 27 is actuated by operating an actuator comprising a bell crank cam carrier or lever 20 that can be operated with a manual handle 18 attached to the bell crank 20, as shown, by inserting the handle 18 in a bore. Alternately, as shown in FIG. 1, a pneumatic cylinder 19C that is connected between the bore 19B on bell crank 20 and a bracket 19A on the upper arm 14 of the frame 13 provides power operation. The bell crank 20 is pivoted on a pin 22 between side plates 23 of a swing bracket 21. The swing bracket 21 can be formed from a piece of suitable material, with a cross member 21A, that will fit into a recess 21B (see FIGS. 6 and 7) at the forward end of the upper arm 14 and be stopped in working position by a lip 21C as it rotates in counter clockwise direction. The side plates 23 of swing bracket are pivotally mounted to the upper arm with a pivot pin 24.

The side plates 23 are formed to include strippers 23A formed as a pair of spaced fingers at the lower end of bracket 21. The fingers forming strippers straddle the punch 26, that is, they extend on opposite sides of the punch 26, down along the sides of the arm 14, and have lower ends that taper in toward the axis of the punch 26, and are positioned so that they strip off a sheet of material 40 from the punch 26 after punching.

In the working position, with the swing bracket 21 retained in the position shown in solid lines in FIG. 6, the swing bracket 21 is formed so that a cam roller 20A, rotatably mounted on a shaft 29B on the bell crank 20, is aligned with or will ride on the punch head 34, when the bell crank is pivoted about its pivot shaft 22 in a counterclockwise direction.

The swing bracket 21 is held in this working position while reacting loads applied to the punch through the use of a back stop or latch member 28 that is pivoted between the side plates 23 on a pivot pin 30. The backstop or latch engages a lug 32 formed on arm 14 when the swing bracket is in working position.

Pivot pin 24 for mounting the swing bracket 21 is off-set from the axis 33 of the die and punch. The bell crank 20 and cam roller are spaced from pivot pin 24 so as the swing bracket pivots to the dotted line position after latch or backstop 28 is released, the roller cam will move laterally a substantial distance to clear the punch.

With the swing bracket 21 in working position, by moving the handle 18 manually, or in other ways pivoting the bell crank 20 counterclockwise about the pin 22, the punch end 26 will be forced down through the material 40 and into the bore in die 16 in a normal manner. Then, when the bell crank 20 is pivoted back, the spring 42 will tend to return the punch 26 to its raised position and the bell crank 20 will pivot in clockwise direction.

The bell crank 20 has an end portion 54 with a pin 56 in bore 19B for attaching to the rod end of the neumatic cylinder 19. The pneumatic cylinder 19 can be operated in any desired manner with a suitable.

When the punch and die are to be changed, the back stop or latch dog 28 is released as the latch dog is pivoted about pin 30 to its dotted line position shown in FIG. 6, so that it slides over or clears the lug surface 32 that is used for reacting the punching forces and holding the swing bracket in its working position. The back stop or latch dog 28 has a finger tab 28A (FIG. 5) for lifting it up to disengage lug 32. The swing bracket 21 can then be pivoted about the pin 24 to its dotted line position shown in FIG. 6. It can be seen that in this position, the cam roller 20A will clear the punch head 34 and spring retainer 44 sufficiently so that the punch 26 can pull out vertically along the central axis of the punch, and then replaced with another punch. The die 16 also can be pulled out of its bore because the strippers 23A are swung out of the way to permit the die to be removed and replaced with a die mating the new punch.

When the change in operation has been completed, the swing bracket 21 can be moved back to its original position.

Figure 2:
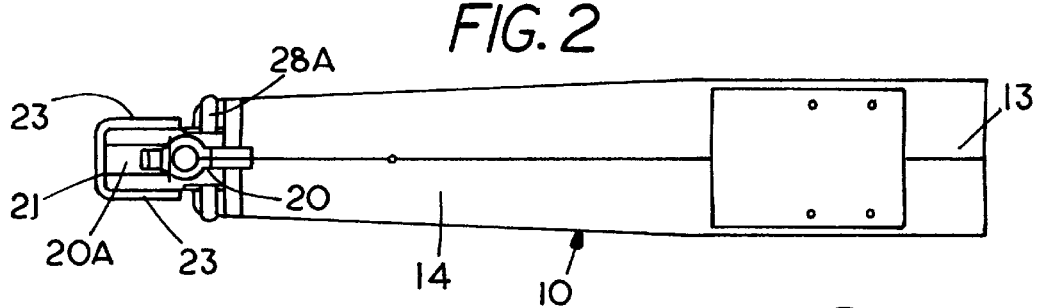
FIG. 2 is a top plan view of the punch press in FIG. 1 with an actuator assembly removed.
Figure 3:
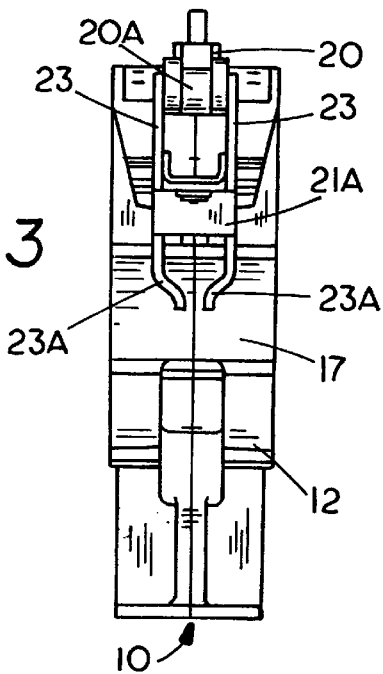
FIG. 3 is a front elevational view of the punch press of FIG. 1.

When pneumatic cylinder operation is not desired, it can be removed to permit the swing bracket to be swung manually back as shown in dotted lines in FIG. 2.

Although the present invention has been described with reference to preferred embodiments, workers skilled in the art will recognize that changes may be made in form and detail without departing from the spirit and scope of the invention.

What is claimed is:

1. A punch assembly comprising:
   a frame having a pair of spaced apart arms in registry with one another;
   a support for a die on a first of said arms, and a punch actuator assembly on the second of said arms, said punch actuator assembly including a swing bracket pivotally mounted to the second of said arms at a first pivot;
   a punch slidably mounted on the second arm for movement toward and away from the die;
   an actuator for engaging the punch and moving the punch in a direction toward the die for punching a material supported on the die; and
   a latch for holding the swing bracket in a working position, and releasable to permit said swing bracket to move about the first pivot to a position wherein the actuator moves laterally of the punch and permits the punch to be removed from the arm in a direction away from the die.

2. The punch assembly of claim 1, wherein said actuator comprises a pivoting lever having a roller on one end to engage the punch for moving the punch toward the die as the lever is pivoted.

3. The punch assembly of claim 2, wherein said lever is pivotally mounted to said swing bracket about a second pivot axis spaced from the first pivot axis in a direction extending away from the die.

4. The punch assembly of claim 2, wherein said lever has a manually actuatable handle attached thereto.

5. The punch assembly of claim 2, wherein said lever has a power operator coupled thereto, said power operator being anchored to a portion of the frame.

6. The punch assembly of claim 1, wherein said latch comprises a pivoted member mounted on the swing bracket in position to engage a lug on the frame to support the swing bracket in a working position.

7. The punch assembly of claim 1, wherein said frame comprises a pair of arms that are spaced apart at their outer ends, and joined at inner ends, said arms having a length from the outer ends to the inner ends of between 6 and 10 times the spacing between the arms at the outer ends.

8. The punch assembly of claim 1, wherein said swing bracket comprises a pair of side plates, said side plates being on opposite sides of one of the arms of the frame, a cross member joining the side plates in position on the exterior of one end of said one arm.

9. The punch assembly of claim 8, wherein said side plates each have a material stripper extending from the side plate along side of the punch a selected distance.

10. The punch assembly of claim 9, wherein said cross member engages a stop portion of the frame when the punch is in a working position to stop movement, in a first direction of pivoting opposite from a direction of pivoting stopped by the latch.

11. A punch assembly having a punch frame, said frame having a pair of generally coextensive arms joined together at first ends and spaced apart at second ends, the distance between the first ends and the second ends being substantially 6 to 10 times the spacing between the arms at the first ends, a die mounted on one of said arms, and a punch slidably mounted on the other of said arms for cooperating with the die for punching material held between the arms.

12. The punch assembly of claim 11, and a swing bracket actuator comprising a swing bracket pivotally mounted to said other arm and having an actuating lever thereon movable about a second pivot to engage the punch and move the punch toward the die under load being applied to the lever with the swing bracket in a working position, a latch for releasably holding said swing bracket in the working position, and being releasable to permit said swing bracket to move to position wherein the actuator clears the path of the punch for removing it in a direction away from the die.

13. The punch assembly of claim 12, and a roller rotatably mounted on the lever and positioned to engage the end of the punch when the lever is moved.

14. The punch assembly of claim 13, wherein said lever comprises a bell crank having a manually operated handle thereon for loading the bell crank to move the punch toward the die.

15. A punch and die apparatus comprising:
   a frame having a pair of spaced apart arms in registry with one another;
   a support for a die on a first of said arms, and a punch assembly on the second of said arms, said punch assembly including a swing bracket pivotally mounted to the second of said arms at a first pivot;
   a punch slidably mounted on the second arm for movement toward and away from the die and being spring loaded in a direction away from the die; and
   an actuator for engaging the punch and moving the punch in a direction toward the die for punching a material supported on the die, the swing bracket being movable between a working position and a punch and die changing position, said swing bracket being movable about the first pivot to a second position wherein the actuator moves with the swing bracket laterally of the punch and permits the punch and die to be removed from the arms of the frame.

16. The punch and die apparatus of claim 15, wherein said actuator comprises a pivoting lever having a roller on one end to engage an end of the punch for moving the punch toward the die as the lever is pivoted.

17. The punch and die apparatus of claim 15, wherein said swing bracket is held in working position by stops which prevent pivoting of the swing bracket, one of the stops being a releasable latch to permit the swing bracket to be moved to its second position.

* * * * *